(12) United States Patent
Zheleznyakov et al.

(10) Patent No.: US 6,485,846 B1
(45) Date of Patent: Nov. 26, 2002

(54) CORROSION RESISTANT GAUGE COMPONENT

(75) Inventors: Alexander L. Zheleznyakov, Doylestown, PA (US); Joseph F. Karpov, Yardley, PA (US)

(73) Assignee: Ametek, Inc., Paoli, PA (US)

( * ) Notice: Subject to any disclaimer, the term of this patent is extended or adjusted under 35 U.S.C. 154(b) by 17 days.

(21) Appl. No.: 09/675,225

(22) Filed: Sep. 29, 2000

(51) Int. Cl.[7] .................. B32B 15/01; B32B 15/20; G01L 7/04
(52) U.S. Cl. .................. 428/671; 428/673; 428/674; 428/675; 428/636; 428/646; 73/732
(58) Field of Search .................. 428/671, 673, 428/674, 675, 636, 646; 73/732

(56) References Cited

U.S. PATENT DOCUMENTS

| | | |
|---|---|---|
| 9,163 A | 8/1852 | Bourdon |
| 3,075,390 A | 1/1963 | Sheppard |
| 3,975,967 A | 8/1976 | Conti |
| 4,059,998 A | 11/1977 | van der Kolk et al. |
| 4,191,056 A | 3/1980 | Holden |
| 4,615,219 A | 10/1986 | Ache |
| 4,646,406 A | 3/1987 | Weiss et al. |
| 4,822,135 A | 4/1989 | Seaver |
| 4,873,870 A | 10/1989 | Delatorre |
| 4,939,338 A | 7/1990 | Bregy et al. |
| 5,000,049 A | 3/1991 | Cooper et al. |
| 5,197,446 A | 3/1993 | Daywalt et al. |
| 5,581,029 A | 12/1996 | Wahl et al. |
| 5,834,651 A | 11/1998 | McSheffrey et al. |
| 5,895,861 A | 4/1999 | Slonaker |

OTHER PUBLICATIONS

Julius Grant, Hackh's Chemical Dictionary, 1969, McGraw–Hill Book Company, Fourth Edition, p. 436.*

* cited by examiner

*Primary Examiner*—John J. Zimmerman
*Assistant Examiner*—Jason Savage
(74) *Attorney, Agent, or Firm*—RatnerPrestia

(57) ABSTRACT

A component for a gauge comprising a bourdon tube having a first end and a second end. A socket is joined to the first end of the bourdon tube and a closure member is joined to the second end of the bourdon tube. At least one of the bourdon tube and the closure member comprises a copper nickel alloy and/or the socket comprises a nickel silver alloy. In addition, a low temperature soldering material, such as a tin-bismuth soldering material, was used to affix the socket to the bourdon tube and the closure member to the bourdon tube. Preferably, the components contain substantially no free copper. Such a component resists corrosion, especially corrosion formed when certain fluids are used with such components.

25 Claims, 4 Drawing Sheets

CORROSION RESISTANT GAUGE COMPONENT

TECHNICAL FIELD

This invention relates generally to gauges and, more specifically, to a component of a gauge that resists corrosion.

BACKGROUND OF THE INVENTION

The bourdon tube, as invented by E. Bourdon in U.S. Pat. No. 9,163, is a tube having a flat cross section, e.g., an elliptical or rectangular cross section, which is bent in a coil form (e.g., spirally or helically wound) or a "C" shape (e.g., ¾ of a circle). One end of the bourdon tube is stationary and has an open inlet which communicates with a source of pressure. The other end of the bourdon tube is sealed and allowed to move freely in proportion to the difference in pressure between the interior and exterior of the tube. As the pressure within the tube increases, the tube tends to straighten, resulting in a greater deflection. The amount of deflection of the free end of the tube is translated, mechanically or electrically, into a calibrated output indication of pressure.

Many factors must be considered in bourdon tube design to meet the requirements of the application. Factors that affect bourdon tube performance include pressure range, spring rate, corrosion-resistance to the external environment, repeatability, hysteresis, over-pressure, and ambient temperature effect. The bourdon tube shape, size, and material are selected for the particular application.

A particular concern is the corrosion resistance of the bourdon tube to internal fluid. The bourdon tube is typically made of a metallic material, for example, copper alloys, nickel alloys, or stainless steel.

One problem associated with copper alloys bourdon tubes is dealloying. Dealloying is a corrosion process in which the more active metal is selectively removed from an alloy, leaving behind a weak deposit of the more noble metal. Copper-zinc alloys containing more than 15% zinc are susceptible to a dealloying process called dezincification. In the dezincification of brass (a dark yellow alloy of copper and zinc), selective removal of zinc leaves a relatively porous and weak layer of copper and copper oxide. Corrosion of a similar nature continues beneath the primary corrosion layer, resulting in gradual replacement of sound brass with weak, porous copper. To address this problem, it is known to add inhibitors to admiralty brass in an attempt to reduce corrosion. Unfortunately, the addition of inhibitors in admiralty brass do not prevent dezincification in harmful soldering processes, such as at high temperature (e.g., 700° F.) and processes using acidic flux.

Other copper alloys are also susceptible to dealloying. Copper-tin alloys are susceptible to a dealloying process known as desstannification. Green discloration results when a bourdon tube of the prior art is placed in contact with ISOVUE 370 solution ($C_{17}H_{22}I_3N_3O_8$), often used in certain medical applications and manufactured by Bracco, Inc. of Princeton, N.J. For example, copper iodite, $Cu(IO_3)_2$, and/or copper iodite basic, $Cu(OH)IO_3$, are formed as a reaction between the copper and ISOVUE 370 solution. One additional source of green discoloration is copper acetate, $Cu(C_2H_3O_2)_2 \cdot H_2O$, which results from a reaction of copper and organic flux (i.e., acetic acid). In addition, a reaction between copper and standard flux (i.e., hydrobromic acid) can produce copper bromate, $Cu(BrO_3)_2 \cdot 6H_2O$.

Another problem associated with bourdon tubes containing copper is the formation of a green patina, $Cu_2CO_3(OH)$, on copper and its alloys. This process is caused by the reaction between exposed metal and air containing moisture and carbon dioxide:

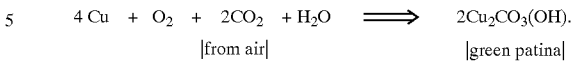

$$4\,Cu\ +\ O_2\ +\ 2CO_2\ +\ H_2O \Longrightarrow 2Cu_2CO_3(OH).$$
$$\text{|from air|} \qquad\qquad \text{|green patina|}$$

The majority of green solid substance of copper alloy gauges is related to the formation of green patina. Copper oxide on the internal surfaces of the bourdon tube accelerates the formation of green patina. Gauges containing ISOVUE 370 are commonly used, for instance, to measure pressure of a fluid during angioplasty. The formation of green discolorant is undesirable during such use.

There is a need, therefore, for a component for a gauge which is resistant to corrosion. More specifically, there is a need for a component for a gauge which is resistant to dealloying and which is resistant to the formation of green discolorants, particularly in the presence of ISOVUE 370 solution which is typically used during angioplasty.

SUMMARY OF THE INVENTION

To meet these and other needs, and in view of its purposes, the present invention provides a component for a gauge, such as a pressure gauge, which is resistant to corrosion, including dealloying and the formation of green discolorants, such as copper iodite, copper bromate, and green patina. The invention provides a component for a gauge comprising a bourdon tube having a first end and a second end. A socket is joined to the first end of the bourdon tube and a closure member is joined to the second end of the bourdon tube. At least one of the bourdon tube and the closure member comprises a copper nickel alloy or the socket comprises a nickel silver alloy. The copper nickel alloy of the bourdon tube is preferably identical to, but may be different from, the copper nickel alloy of the closure member.

In one embodiment of the invention, the bourdon tube and/or closure member comprises 65–95%, preferably 70–90%, and most preferably about 70% copper and 5–35%, preferably 10–30%, and most preferably about 30% nickel. In another embodiment of the invention, the socket comprises copper, nickel, and zinc. Preferably, the socket comprises copper, nickel, zinc, manganese, and lead.

In yet another embodiment, the socket is joined to the first end of the bourdon tube by a low temperature tin-bismuth soldering material. In another embodiment, the closure member is joined to the second end of the bourdon tube by a low temperature tin-bismuth soldering material.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
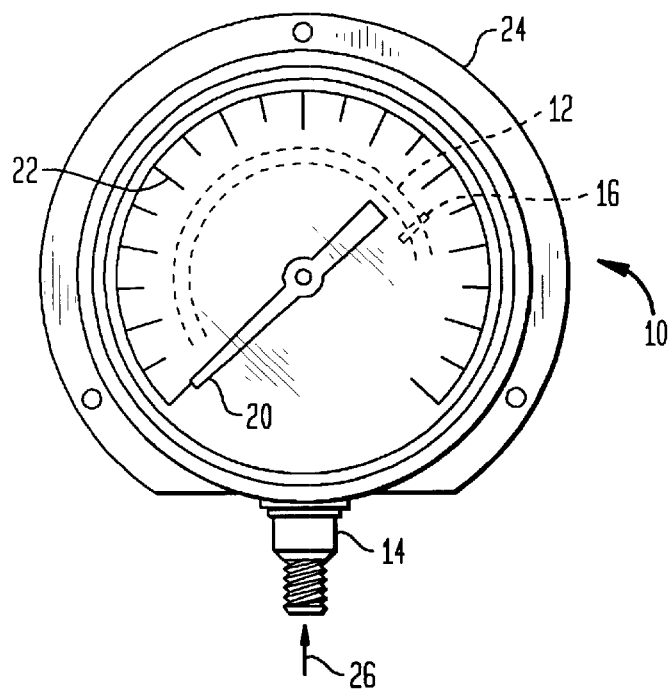
FIG. 1 is a front elevational view of a pressure gauge having a bourdon tube constructed in accordance with the invention.
Figure 2:
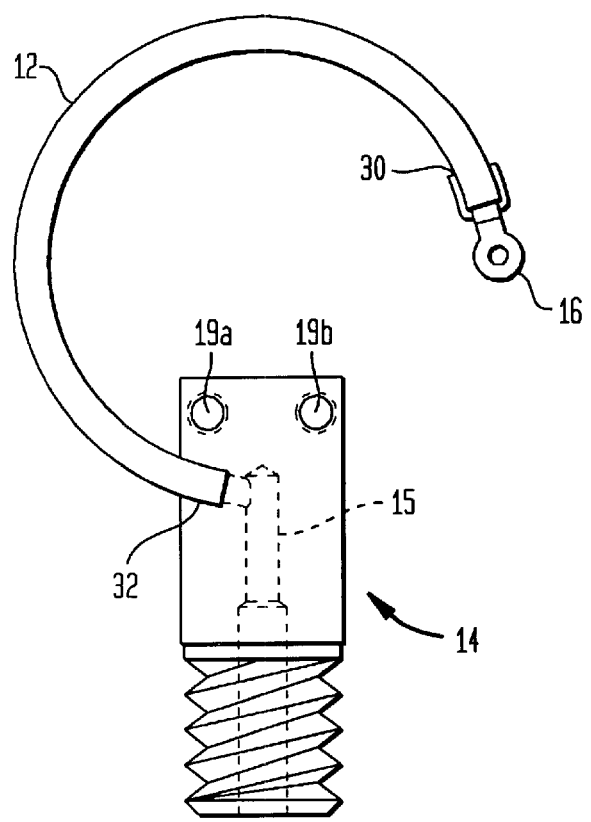
FIG. 2 is a front elevational view of a bourdon tube, socket, and closure member constructed in accordance with the invention.

Referring to FIG. 1, a gauge 10 includes a bourdon tube 12 having a first end fixed to a socket 14 and a second end having a closure member 16. The closure member 16 is coupled to a pointer 20 which moves relative to the face of a dial 22. A generally annularly shaped casing 24 forms the instrument housing and supports the elements of gauge 10 as is generally understood in the art. Fluid entering socket 14, indicated by arrow 26, flows into a central passageway 15 (as shown in FIG. 2) formed in the socket 14. Central passageway 15 is in fluid communication with the interior of bourdon tube 12, and the fluid causes the second end of the bourdon tube to move by an amount dependent upon the fluid pressure. Movement of the second end of bourdon tube 12 causes the pointer 20 to move relative to the face of dial 22, thereby indicating the pressure of the fluid. As is known to those of ordinary skill in the art, gauge 10 can also be adapted to measure the temperature of the fluid.

Figure 3:
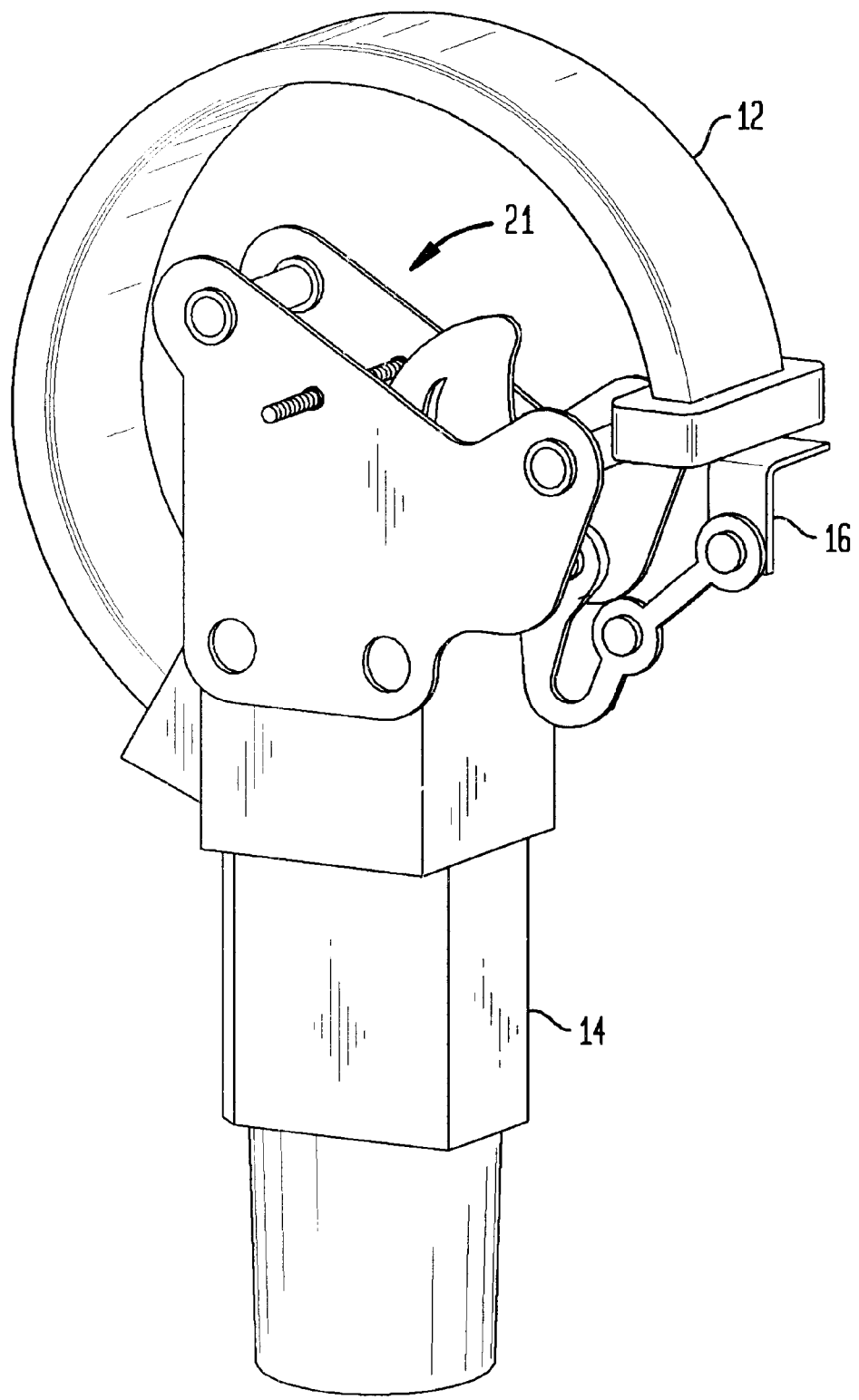
FIG. 3 is perspective view of another bourdon tube, socket, closure member, and movement assembly constructed in accordance with the invention.

FIGS. 2 and 3 illustrate different views and aspects of the device of the present invention. As shown in FIG. 2, bourdon tube 12 has a first end joined to socket 14. In addition, FIG. 2 shows mounting holes 19a and 19b for mounting a movement assembly to the socket. In the view shown in FIG. 3, movement assembly 21 is shown which is coupled to socket 14 and closure member 16. Movement assembly 21 translates the extension of bourdon tube 12 into a rotational movement of the pointer 20 in a known way.

In one embodiment of the invention, at least one of the bourdon tube 12 and closure member 16 comprises a copper nickel alloy. In a preferred embodiment, at least one of the bourdon tube and closure member comprises 65–95%, preferably 70–90%, and most preferably about 70% copper and 5–35%, preferably 10–30%, and most preferably about 30% nickel. Unless otherwise noted, all percentages used herein are given in weight percentages.

The invention also provides a bourdon tube 12 wherein the socket 14 comprises a nickel silver alloy. In a preferred embodiment, the socket comprises copper, nickel, lead, and zinc. In another preferred embodiment, the socket comprises copper, nickel, manganese, lead, and zinc. The weight percentages of these materials can vary over wide ranges depending on the particular application. In one embodiment, they are 38–48% copper, 9–15% nickel, 3–10% manganese, 1–4% lead, and 23–49% zinc. In a preferred embodiment, they are 42–45% copper, 11–13% nickel, 4.5–8% manganese, 1–2.5% lead, and 28–35% zinc.

It has been discovered that constructing at least one of the bourdon tube 12 and closure member 16 with a copper nickel alloy and/or constructing the socket 14 with a nickel silver alloy provides resistance to corrosion, including dealloying and the formation of green discolorants, such as copper iodite, copper bromate, and green patina. In addition, both of these alloys have essentially no "free copper," namely, elemental copper not bound to any other elements or compounds as part of a copper compound. In addition, these alloys have other properties suitable for the functions served. For example, nickel silver alloy has sufficient hardness for the socket to be mounted to another component and coupled to a fluid system. The copper nickel alloy of the bourdon tube enclosure member is sufficiently flexible to translate the motion caused by the straightening of the bourdon tube in response to pressure to movement of a pointer.

As shown in FIGS. 2 and 3, closure member 16 can be joined to bourdon tube 12 by a weld 30. In addition, socket 14 can be joined to bourdon tube 12 by a weld 32. In a preferred embodiment of the invention, at least one of weld 30 and weld 32 is a low temperature tin-bismuth soldering material. In another preferred embodiment, the tin-bismuth soldering material is eutectic tin-bismuth having a melting point of about 281° F. The eutectic alloy comprises 42% tin and 58% bismuth. Typically, a much lower flame temperature is needed to melt this soldering material, compared with the flame temperature required to melt standard soldering materials. In another embodiment of the invention, the soldering material of at least one of weld 30 and 32 comprises tin, silver, copper, and antimony having a melting point of about 430° F. With a lower temperature applied, there is less dealloying and oxidation of the device, which results in a decreased corrosion rate, which reduces the formation of green discolorants.

EXAMPLES

Example 1

Bourdon tubes were constructed of three different materials: (i) phosphor bronze bourdon tube, alloy C51000, chemical composition: 94.8% Cu, 5% Sn, 0.2% P, with a brass socket; (ii) admiralty brass bourdon tube, alloy C44300, chemical composition: 71% Cu, 28% Zn, 1% Sn, with a brass socket; and (iii) copper-nickel bourdon tube, alloy C71500, chemical composition: 69.5% Cu, 30% Ni, 05.% Fe, with a nickel silver socket of about 43.5% Cu, 12% Ni, 6.25% Mn, 1.75% Pb, and 36.5% Zn. Commercially available soldering material, having tin, copper, silver, and antimony and a melting temperature of about 430° F., was used to assemble the first two tubes, while a low temperature tin-bismuth (at the eutectic point) solder was used for the third tube listed above.

Figure 4:
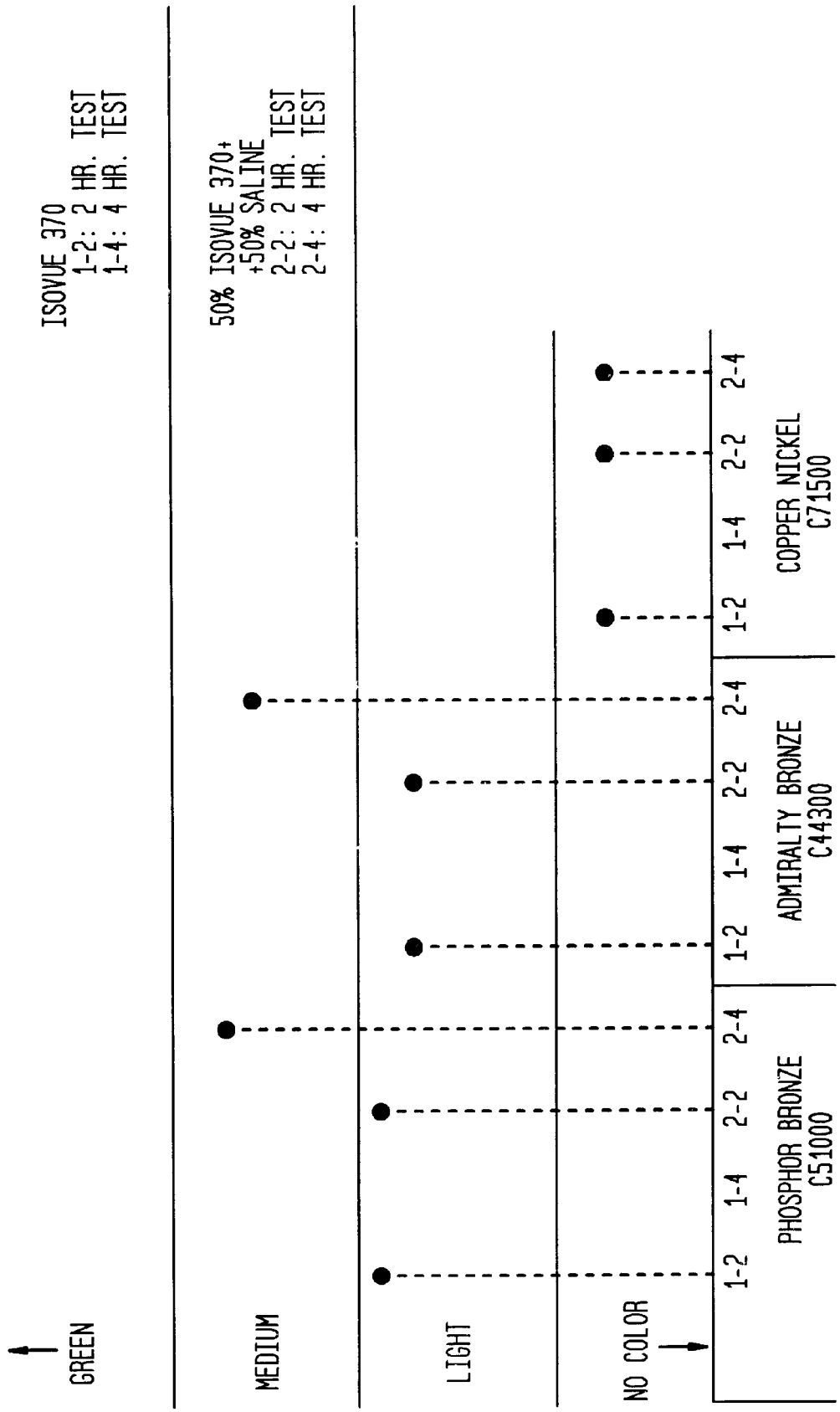
FIG. 4 is a graphical depiction showing the color changes of test solutions removed from varying bourdon tubes.

Bourdon tubes constructed of each of the three materials were filled with ISOVUE 370 solution and placed in inverted plastic beakers to prevent evaporation. ISOVUE 370 is a nonionic, neutral pH contact media, having the formula $C_{17}H_{22}I_3N_3O_8$. After two hours, the solution was removed from each bourdon tube and the color of each solution was visually examined. As shown in FIG. 4, the solutions removed from the phosphor bronze bourdon tube and admiralty brass bourdon tube were lightly discolored, indicating that these tubes corroded. In contrast, the solution removed from the copper-nickel bourdon tube did not discolor, indicating that this tube did not corrode.

Bourdon tubes constructed of each of the three materials were also filled with a solution consisting of equal volumetric amounts of ISOVUE 370 and 0.9% sodium chloride solution. The pH of this solution was 6.2. The bourdon tubes were then placed in inverted plastic beakers to prevent evaporation. After two hours, the solution was removed from each bourdon tube and the color of each solution was visually examined. As shown in FIG. 4, the solutions removed from the phosphor bronze bourdon tube and admiralty brass bourdon tube were lightly discolored, indicating that these tubes corroded. In contrast, the solution removed from the copper-nickel bourdon tube did not discolor, indicating that this tube did not corrode.

Bourdon tubes constructed of each of the three materials were also filled with a solution consisting of equal volumetric amounts of ISOVUE 370 and 0.9% sodium chloride solution. The bourdon tubes were then placed in inverted plastic beakers to prevent evaporation. After four hours, the solution was removed from each bourdon tube and the color of each solution was visually examined. As shown in FIG. 4, the solutions removed from the phosphor bronze bourdon tube and admiralty brass bourdon tube exhibited a medium discoloration, indicating that these tubes corroded. In contrast, the solution removed from the copper-nickel bourdon tube did not discolor, indicating that this tubes did not corrode.

These results indicate that the phosphor bronze bourdon tube, alloy C51000, and admiralty brass bourdon tube, alloy C44300, were susceptible to corrosion when filled with ISOVUE 370 solution or ISOVUE 370/sodium chloride solution. In contrast, the copper-nickel bourdon tube, alloy C71500, resisted corrosion.

Example 2

Gauge assemblies were constructed of three different components: (i) a phosphor bronze bourdon tube with a standard gauge as in Example 1; (ii) an admiralty brass bourdon tube with a standard gauge as in Example 1; and (iii) a copper nickel bourdon tube with an experimental gauge.

Each assembly was tested on inflation devices filled with 10 cc of each of two different solutions: (i) ISOVUE 370 solution; and (ii) a solution consisting of equal volumetric amounts of ISOVUE 370 and 0.9% sodium chloride solution. A pressure of 80 psi was then applied after carefully allowing entrapped air to escape from each device. After 2 and 4 hours, the applied pressure was released and the solutions were examined for discoloration.

Figure 5:
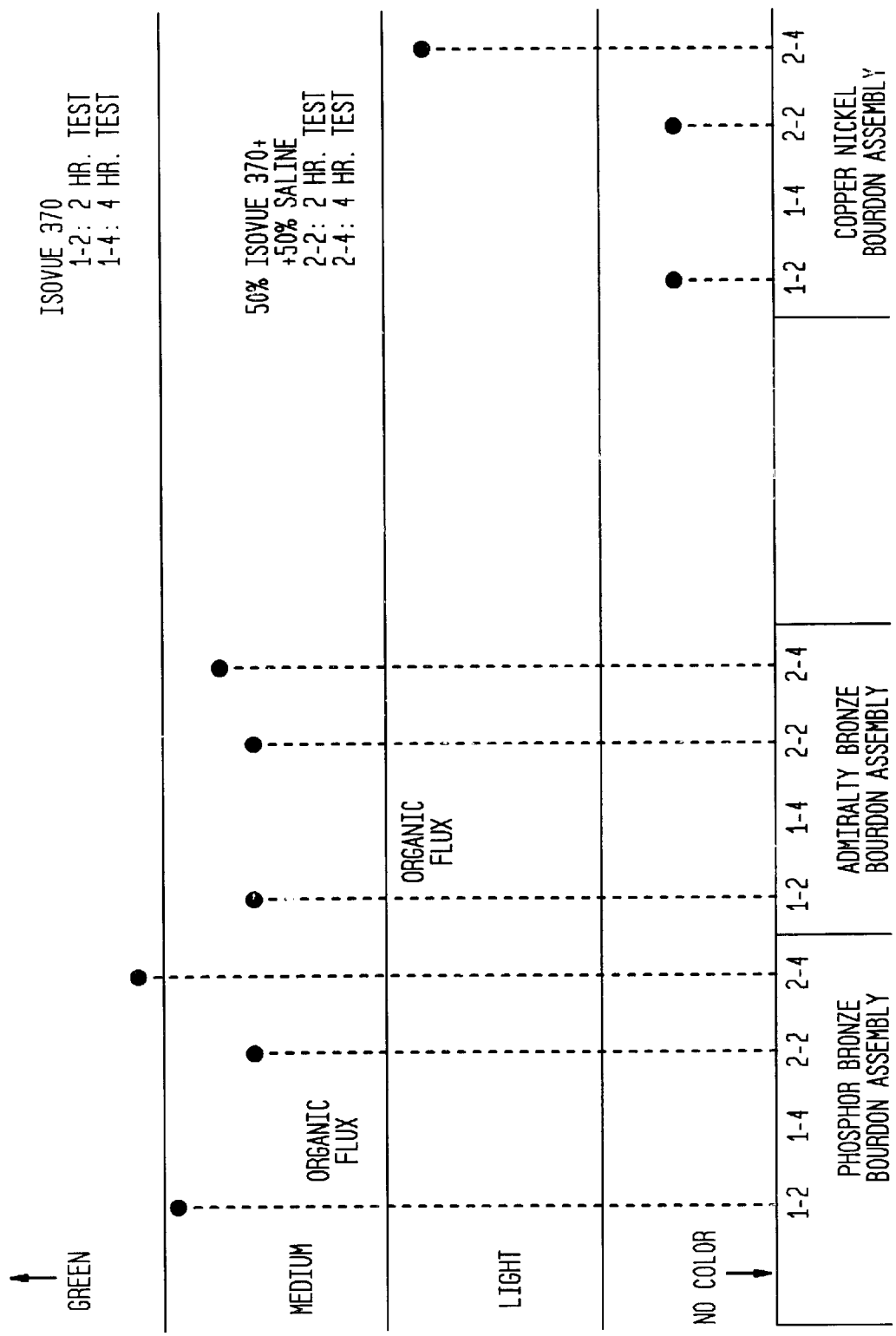
FIG. 5 is a graphical depiction showing the color changes of test solutions removed from varying gauge assemblies.

As shown in FIG. 5, the solutions removed from the phosphor bronze bourdon tube with standard gauge assembly and the admiralty brass bourdon tube with standard gauge assembly both exhibited a medium discoloration after two hours, indicating that these assemblies corroded. After four hours, the phosphor bronze bourdon tube with standard gauge assembly exhibited a darker green discoloration, and the admiralty brass bourdon tube with standard gauge assembly exhibited a medium discoloration, also indicating that these assemblies corroded.

In contrast, the ISOVUE 370 and ISOVUE 370/sodium chloride solutions removed from the copper nickel bourdon tube assembly after six hours did not exhibit any discoloration. Although FIG. 5 shows a light color after four hours, this test was repeated and showed no color at four and even six hours.

Although illustrated and described above with reference to specific embodiments, the invention is nevertheless not intended to be limited to the details shown. Rather, various modifications may be made in the details within the scope and range of equivalents of the claims and without departing from the spirit of the invention.

What is claimed is:

1. A component for a gauge comprising:
 a bourdon tube having a first end and a second end;
 a socket joined to the first end of said bourdon tube; and
 a closure member joined to the second end of said bourdon tube,
 wherein at least one of said bourdon tube and said closure member comprises a copper nickel alloy comprising between 65–95% copper and between 5–35% nickel, or wherein said socket comprises a nickel silver alloy.

2. The component of claim 1 wherein said copper nickel alloy comprises between 70–90% copper and between 10–30% nickel.

3. The component of claim 2 wherein said copper nickel alloy comprises about 70% copper and about 30% nickel.

4. The component of claim 1 wherein said nickel silver alloy comprises copper, nickel, lead, and zinc.

5. The component of claim 4 wherein said nickel silver alloy further comprises manganese.

6. The component of claim 5 wherein said nickel silver alloy comprises 38–48% copper, 9–15% nickel, 3–10% manganese, 1–4% lead, and 23–49% zinc.

7. The component of claim 6 wherein said nickel silver alloy comprises 42–45% copper, 11–13% nickel, 4.5–8% manganese, 1–2.5% lead, and 28–35% zinc.

8. The component of claim 1 wherein said socket is joined to the first end of said bourdon tube by a low temperature tin-bismuth soldering material.

9. The component of claim 1 wherein said closure member is joined to the second end of said bourdon tube by a low temperature tin-bismuth soldering material.

10. The component of claim 1, wherein said bourdon tube, said socket, and said closure member contain substantially no free copper.

11. A component for a gauge comprising:
 a bourdon tube having a first end and a second end, said bourdon tube comprising a first copper nickel alloy;
 a socket joined to the first end of said bourdon tube, said socket comprising a nickel silver alloy; and
 a closure member joined to the second end of said bourdon tube, said closure member comprising a second copper nickel alloy.

12. The component of claim 11 wherein said first and second copper nickel alloy comprise between 65–95% copper and between 5–35% nickel.

13. The component of claim 12 wherein said first and second copper nickel alloy comprises between 70–90% copper and between 10–30% nickel.

14. The component of claim 13 wherein said first and second copper nickel alloy comprises about 70% copper and about 30% nickel.

15. The component of claim 11 wherein said nickel silver alloy comprises copper, nickel, lead, and zinc.

16. The component of claim 15 wherein said nickel silver alloy further comprises manganese.

17. The component of claim 16 wherein said nickel silver alloy comprises 38–48% copper, 9–15% nickel, 3–10% manganese, 1–4% lead, and 23–49% zinc.

18. The component of claim 17 wherein said nickel silver alloy comprises 42–45% copper, 11–13% nickel, 4.5–8% manganese, 1–2.5% lead, and 28–35% zinc.

19. The component of claim 11 wherein said socket is joined to the first end of said bourdon tube by a low temperature tin-bismuth soldering material.

20. The component of claim 11 wherein said closure member is joined to the second end of said bourdon tube by a low temperature tin-bismuth soldering material.

21. The component of claim 11, wherein said first copper nickel alloy is different from said second copper nickel alloy.

22. The component of claim 11, wherein said first copper nickel alloy is the same as said second copper nickel alloy.

23. A component for a gauge comprising:
 a bourdon tube having a first end and a second end;
 a socket joined to the first end of said bourdon tube wherein said socket comprises a nickel silver alloy comprising copper, nickel, lead, and zinc; and a closure member joined to the second end of said bourdon tube, wherein at least one of said bourdon tube and said closure member comprises a copper nickel alloy.

24. A component for a gauge comprising:

a bourdon tube having a first end and a second end;

a socket joined to the first end of said bourdon tube by a low temperature tin-bismuth soldering material; and a closure member joined to the second end of said bourdon tube, wherein at least one of said bourdon tube and said closure member comprises a copper nickel alloy or wherein said socket comprises a nickel silver alloy.

25. A component for a gauge comprising:

a bourdon tube having a first end and a second end;

a socket joined to the first end of said bourdon tube; and a closure member joined to the second end of said bourdon tube by a low temperature tin bismuth soldering material, wherein at least one of said bourdon tube and said closure member comprises a copper nickel alloy or wherein said socket comprises a nickel silver alloy.

* * * * *